(12) United States Patent
Mikura

(10) Patent No.: US 8,430,215 B2
(45) Date of Patent: Apr. 30, 2013

(54) BRAKE DISKS FOR A VEHICLE, METHOD OF MANUFACTURING SAME, AND VEHICLE INCORPORATING SAME

(75) Inventor: Keita Mikura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 353 days.

(21) Appl. No.: 12/721,615

(22) Filed: Mar. 11, 2010

(65) Prior Publication Data

US 2010/0243390 A1    Sep. 30, 2010

(30) Foreign Application Priority Data

Mar. 31, 2009 (JP) ................................ 2009-087773

(51) Int. Cl.
*F16D 65/10* (2006.01)
(52) U.S. Cl.
USPC .................................................. 188/218 XL
(58) Field of Classification Search ............ 188/17, 188/18 R, 18 A, 218 R, 218 XL; 29/407.05
See application file for complete search history.

(56) References Cited

U.S. PATENT DOCUMENTS

| 4,989,696 A * | 2/1991 | Buell ................... 188/218 XL |
| 6,634,081 B2 * | 10/2003 | Kohler et al. ................. 29/596 |
| 2007/0102247 A1 | 5/2007 | Takenaka et al. |
| 2009/0266655 A1 * | 10/2009 | Mikura et al. ............ 188/218 A |

FOREIGN PATENT DOCUMENTS

| JP | 55-086632 A | 6/1980 |
| JP | 2005-195112 A | 7/2005 |
| JP | 2008-298094 A | 12/2008 |
| WO | 2007/041683 A1 | 4/2007 |

* cited by examiner

*Primary Examiner* — Robert A Siconolfi
*Assistant Examiner* — Anna Momper
(74) *Attorney, Agent, or Firm* — Carrier Blackman & Associates, P.C.; William D. Blackman; Joseph P. Carrier

(57) ABSTRACT

A method of manufacturing brake disks for front and rear wheels of a saddle-type vehicle includes steps of cutting out a disk member from a stainless steel plate member, further cutting out an intermediate portion in a diametrical direction of the disk member in a wave shape in a circumferential direction for producing an outer side disk and an inner side disk. The method also includes further steps of determining the wave portion of the outer side disk which projects to the inner side in a diametrical direction as an attaching portion, and determining the wave portion of the inner side disk which projects to the outer side in a diametrical direction as a pad sandwiching portion. The outer side disk is usable as a disk brake for the front wheel, and the inner side disk is usable as a brake disk for the rear wheel of the vehicle.

11 Claims, 7 Drawing Sheets

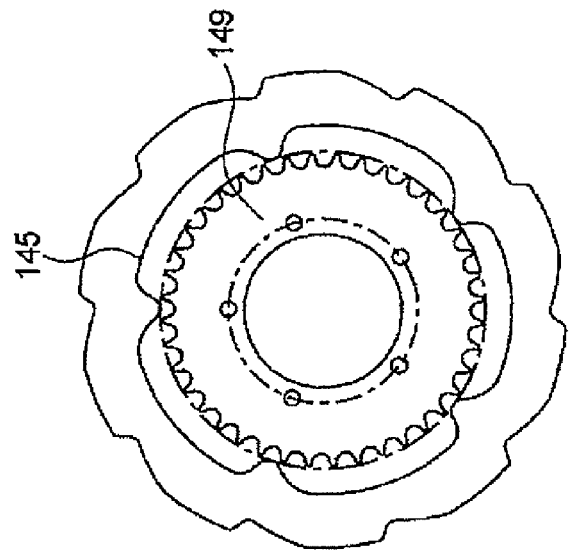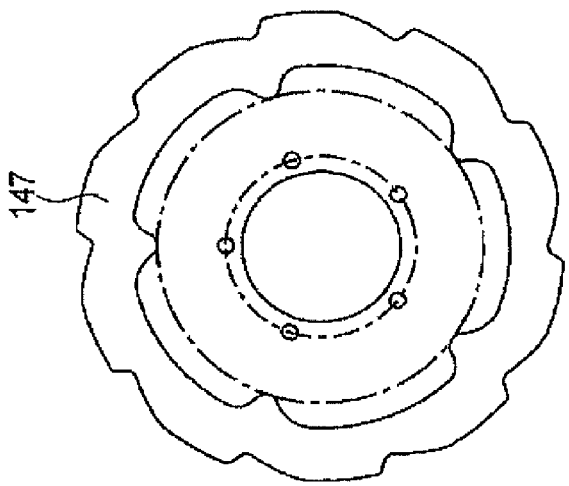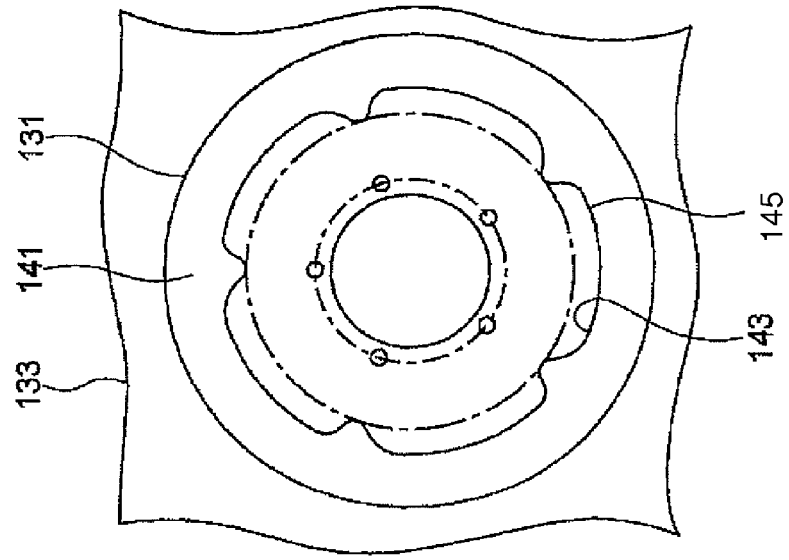

BRAKE DISKS FOR A VEHICLE, METHOD OF MANUFACTURING SAME, AND VEHICLE INCORPORATING SAME

CROSS-REFERENCE TO RELATED APPLICATIONS

The present invention claims priority under 35 USC 119 based on Japanese patent application No. 2009-087773, filed on Mar. 31, 2009. The entire subject matter of this priority document, including the specification, claims and drawings thereof is incorporated by reference herein.

BACKGROUND OF THE INVENTION

1. Field of the Invention

The present invention relates to brake disks for a vehicle, to a method of manufacturing the brake disks, and to a vehicle incorporating the brake disks. More particularly, the present invention relates to a method of manufacturing brake disks for front and rear wheels of a saddle-type vehicle by cutting out an intermediate portion of a disk member in a diametrical direction thereof, as well as to brake disks which are a product of the described method, and to a vehicle incorporating such brake disks.

2. Description of the Background Art

There is a known a brake disk having an outer circumference thereof including a wave shape, for a motorcycle, e.g., a conventional saddle-type vehicle. The appearance of a brake disk can be improved, and a cooling performance thereof can be raised when the brake disk is formed as a wave disk, i.e., the brake disk having a wave portion. An example of such brake disk is disclosed in Japanese Patent Laid-Open No. 2005-195112.

However, although the brake disk disclosed in Japanese Patent Laid-Open No. 2005-195112 can improve the appearance of the brake disk and raise the cooling performance thereof, and also, reduce abrasion by earth and sand by scraping out earth and sand between the disk and the pads by the wave portion of the brake disk, the productivity thereof is not referred to. In other words, the productivity of such brake disks is low.

Generally, when a wave disk having such a conventional structure, for example, as described in the Japanese Patent Laid-Open No. 2005-195112, is adopted for a front wheel (FR) and a rear wheel (RR) of a motorcycle, since the brake disks for the front wheel FR and the rear wheel RR are separately manufactured by blanking from (cutting out) different plate materials by a press, and the left-over plate materials remaining after the brake disks are blanked by the press are often abandoned. In other words, much material waste is brought about, and there is a problem in achieving a desired productivity yield at reduced manufacturing and material costs.

The present invention has been made to overcome such drawbacks of existing methods of manufacturing brake disks for the front and rear wheels of a vehicle. Accordingly, it is one of the objects of the present invention provide wave-shaped brake disks for the front and rear wheels of the vehicle, and a method of manufacturing the wave-shaped brake disks, which can improve the production yield of the brake disks.

SUMMARY OF THE INVENTION

In order to achieve the above objects, a first aspect of the present invention provides a method of manufacturing brake disks, including the steps of cutting out a single disk member from a plate member; and further cutting out an intermediate portion in a diametrical direction of the disk member into a wave shape in a circumferential direction for producing an outer side disk and an inner side disk. The wave portion which projects to the inner side in a diametrical direction of the outer side disk is determined as an attaching portion to a wheel, and the wave portion of the inner side disk which projects to the outer side in a diametrical direction is determined as a pad sandwiching portion.

In the method of manufacturing brake disks according to the first aspect hereof, the single disk member is blanked at an intermediate portion thereof in a diametrical direction for obtaining two large and small disks as the outer side disk and the inner side disk. Here, while the attaching portion is provided from a wave which projects to the inner side in a diametrical direction of the outer side disk, the wave projecting to the outer side in a diametrical direction of the inner side disk can be made a pad sandwiching portion. Accordingly, the braking effectiveness of the inner side disk can be maximized.

Further, the heat mass of the brake disk can be assured greater by an amount provided by the wave, and also it becomes easy to apply the brake disk to a vehicle such as a large motorcycle.

The present invention according to a second aspect thereof, in addition to the first aspect, is characterized in that the outer side disk is used as a brake disk for a front wheel of a saddle-type vehicle, and the inner side disk is used as a brake disk for a rear wheel of the same saddle-type vehicle.

In the method of manufacturing brake disks according to the second aspect hereof, the two large and small disks as the inner side disk and the outer side disk blanked from the single disk member can be ready as one set for one saddle-type vehicle, and also it becomes easy to carry out the parts management.

The present invention according to a third aspect thereof, in addition to the second aspect, is characterized in that in that the brake disk for the front wheel has an outer diameter of at least 300 mm or more, and the brake disk for the rear wheel has a maximum outer diameter of 240 mm or less.

In the method of manufacturing brake disks according to the third aspect hereof, the outer diameters of the two blanked large and small disks as the outer side disk and the inner side disk are assured to be at least 300 mm and 240 mm, respectively, which are preferable in that the braking effectiveness for a large motorcycle can be assured sufficiently.

The present invention according a fourth aspect thereof provides a disk brake system for a saddle-type vehicle. A brake disk is provided for each of a front wheel and a rear wheel of the vehicle. The brake disk for the front wheel includes an annular disk portion for being sandwiched by brake pads and an attaching portion provided in such a manner as to project to the inner side in a diametrical reaction of the disk portion. The brake disk for the rear wheel includes a disk portion having a wave-shaped outer periphery for being sandwiched by brake pads and an attaching portion provided on the inner side in a diametrical direction with respect to the disk portion. A maximum outer diameter of the wave-shaped outer periphery of the brake disk for the rear wheel is greater than an outer diameter of a projecting end of a maximum projecting portion of the attaching portion of the brake disk for the front wheel. A minimum outer diameter of the wave-shaped outer periphery of the brake disk for the rear wheel is equal to a diameter of a projecting end of the attaching portion of the brake disk for the front wheel.

In the disk brake system according to the fourth aspect hereof, the two large and small disks as the inner side disk and the outer side disk blanked from a single disk member can be ready as one set for one saddle-type vehicle, and also it becomes easy to carry out the parts management. Here, while an attaching portion is provided from a wave which projects to the inner side in a diametrical direction of the outer side disk, the wave projecting to the outer side in a diametrical direction of the inner side disk can be made a pad sandwiching portion. Accordingly, the braking effectiveness of the inner side disk can be maximized.

Further, the heat mass of the brake disk can be assured greater by an amount provided by the wave, and also it becomes easy to apply the brake disk to a vehicle such as a large motorcycle.

The present invention according to a fifth aspect thereof, in addition to the fourth aspect, is characterized in that in that the brake disk for the front wheel has an outer diameter of at least 300 mm or more, and the brake disk for the rear wheel has a maximum outer diameter of 240 mm or less.

In the brake disk according to the fifth aspect hereof, the outer diameters of the two blanked large and small disks as the outer side disk and the inner side disk are assured to be at least 300 mm and 240 mm, respectively.

EFFECTS OF THE INVENTION

According to the first aspect of the method of manufacturing the brake disks, the single disk member is blanked at an intermediate portion thereof in a diametrical direction for producing two large and small disks as the outer side disk and the inner side disk. Consequently, the production yield of wave disks can be improved.

According to the second aspect of the method of manufacturing brake disks, the two large and small disks as the inner side disk and the outer side disk blanked from the single disk member can be ready as one set, and the brake disk for the front wheel FR and the brake disk for the rear wheel RR of the same saddle-type vehicle can be manufactured by pressing from the same piece of material. Therefore, it is easy to manage the manufactured brake disks.

According to the third aspect of the method of manufacturing brake disks, the outer diameters of the two blanked large and small disks as the outer side disk and the inner side disk can be assured to be at least 300 mm and 240 mm, respectively. Consequently, the two disks can be applied, in general, as the brake disk for the front wheel FR and the brake disk for the rear wheel of a saddle-type vehicle.

According to the fourth aspect of the present invention, the two large and small disks as the inner side disk and the outer side disk blanked from the single disk member can be ready as one set, and the brake disk for the rear wheel FR and the brake disk for the rear wheel RR of the same saddle-type vehicle can be manufactured by pressing from the same piece of material. Therefore, it is easy to manage the manufactured brake disks.

According to the fifth aspect of the present invention, the outer diameters of the two blanked large and small disks as the outer side disk and the inner side disk can be assured to be at least 300 mm and 240 mm, respectively. Consequently, the two disks can be applied as the brake disk for the front wheel and the brake disk for the rear wheel of the saddle-type vehicle.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 7A is plan view of a sprocket wheel obtained by an initial blanking step of the disk member according to a modification.

FIG. 7B is plan view of a sprocket wheel obtained by a further blanking step of the disk member according to the modification.

FIG. 7C is plan view of a sprocket wheel obtained by a still further blanking step of the disk member according to the modification.

DETAILED DESCRIPTION OF ILLUSTRATIVE EMBODIMENTS

Figure 1:
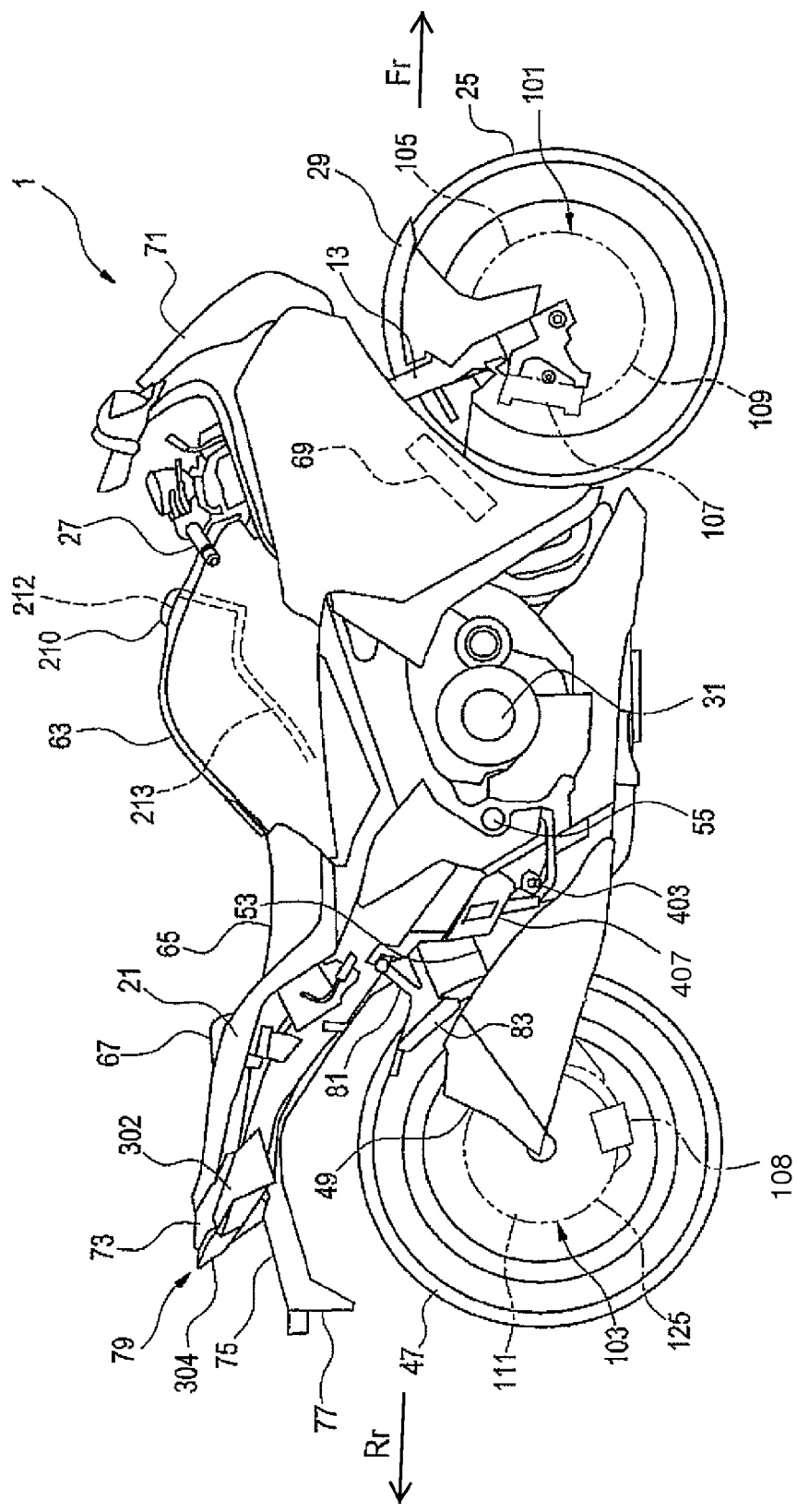
FIG. 1 is a side elevational view showing a basic structure of a motorcycle according to an illustrative embodiment of the present invention

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

In the following description, an illustrative embodiment of a method of manufacturing brake disks, a disk brake system and a vehicle having the disk brake system according to the present invention is described in detail with reference to the drawings.

It may be noted that the drawings should be viewed in the direction of reference characters, and in the following description, the forward, rearward, leftward, rightward, upward and downward directions are those as viewed from a driver and the front side of the vehicle is denoted by Fr, the rear side by Rr, the left side by L, the right side by R, the upper side by U and the lower side by D.

The present invention is applied preferably, for example, to a saddle-type vehicle such as, e.g., a motorcycle.

Figure 2:
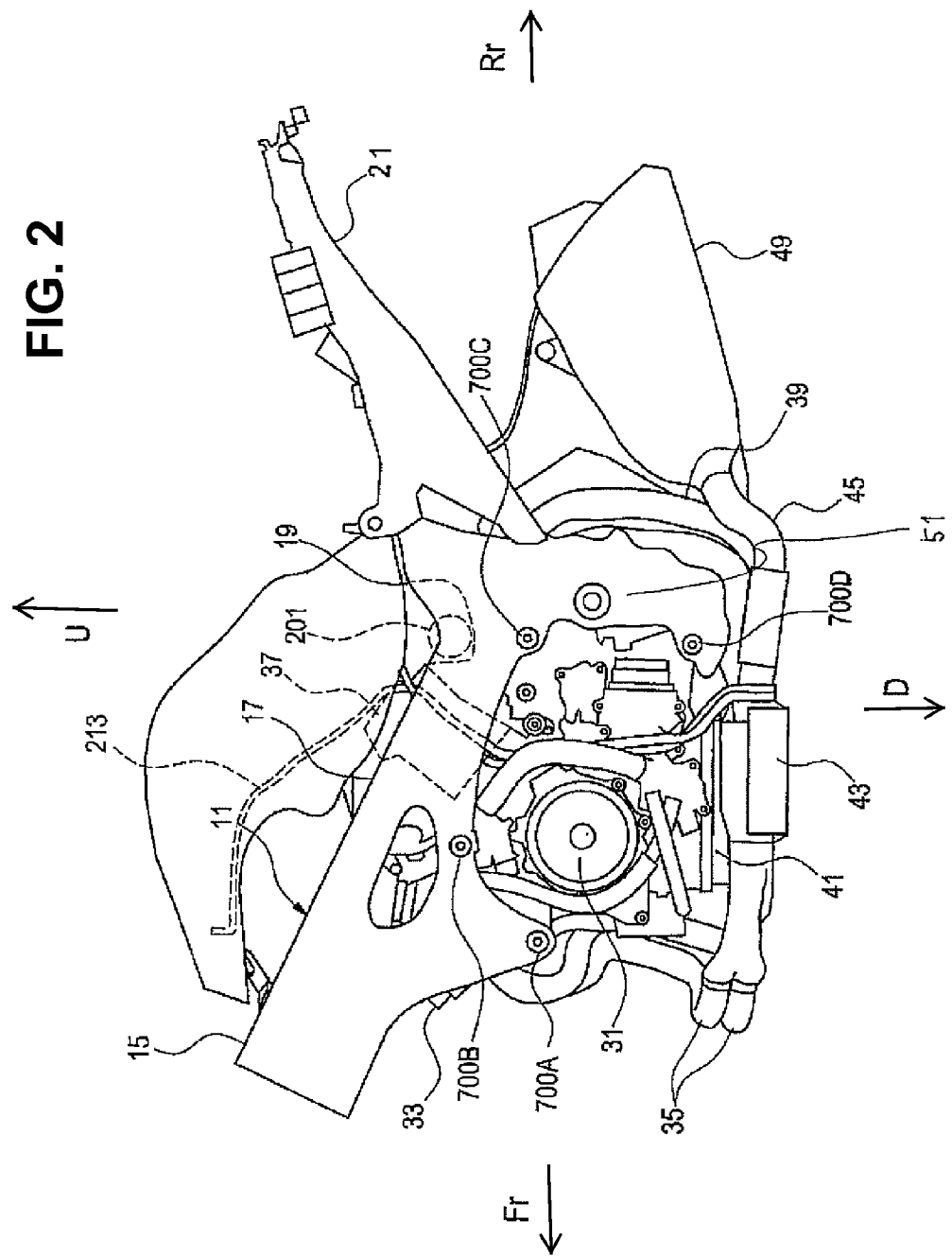
FIG. 2 is a left side elevational view of a vehicle body of the motorcycle.

FIG. 1 is a side elevational view showing a basic structure of a motorcycle 1 according to an illustrative embodiment of the present invention. FIG. 2 is a left side elevational view of a vehicle body of the motorcycle 1.

The motorcycle 1 includes a vehicle body frame 11. The vehicle body frame includes a head pipe 15 for supporting a front fork 13 for steering operation, a pair of left and right main frames 17 extending rearwardly downwards from the head pipe 15, a pair of left and right intermediate frames 19 connecting to rear ends of the main frames 17 and extending upwardly and downwardly, and a pair of left and right seat rails 21 extending rearwardly upwards from upper portions of the intermediate frames 19.

A front wheel 25 is rotatably supported at a lower end of the front fork 13, and a bar handle 27 is connected to an upper end of the front fork 13. A front fender 29 for covering the front wheel 25 from above is supported on the front fork 13.

A disk brake system 101 and a disk brake system 103 shown in FIG. 1 are respectively attached to the front wheel 25 and a rear wheel 47 of the motorcycle. For example, the disk brake system 101 of the front wheel 25 has a brake disk 105 secured to the front wheel 25 for integral rotation with the front wheel 25, and a caliper 107 attached to the front fork 13, and the disk brake system 103 of the rear wheel 47 has a brake disk 111 secured to the rear wheel 47 for integral rotation with the rear wheel 47, and a caliper 108.

The caliper 107 has built therein a pair of left and right friction pads which are moved in directions toward and away from each other through pistons (not shown) by a hydraulic pressure generated by a master cylinder (not shown). Braking faces 109 and 125 of the brake disks 105 and 111 are sandwiched under pressure by the friction pads to apply braking force to the front wheel 25 and the rear wheel 47.

A V-type water-cooled 4-cylinder engine 31 is suspended on the main frames 17 and the intermediate frames 19 in such a manner as to be supported by a first supporting portion 700A, a second supporting portion 700B, a third supporting portion 700C and a fourth supporting portion 700D, as shown in FIG. 2. A front side cylinder exhaust pipe 35 extends forwardly from a front side cylinder 33 of the engine 31, and a rear side cylinder exhaust pipe 39 extends rearwardly again from a rear side cylinder 37 and extends forwardly and then extends rearwardly again. The front side cylinder exhaust pipe 35 and the rear side cylinder exhaust pipe 39 extend downwardly along the front face of a crankcase 41 of the engine 31 and is positioned below the crankcase 41 through a catalyst chamber (CAT chamber) 43.

The catalyst chamber 43 is connected to a rear collecting pipe 45 through a collecting pipe hereinafter described. The catalyst chamber 43 is disposed in a space formed between a lower portion of the crankcase 41 and the rear wheel 47 and is connected to a muffler 49 which extends to the vehicle body right side of the rear wheel 47. The rear collecting pipe 45 is supported below the crankcase 41.

The muffler 49 is disposed in an intersecting relationship, when viewed in side elevational view, with a swing arm 53. The swing arm 53 includes a rear end portion at which the rear wheel 47 is supported. The swing arm 53 is suspended by a rear shock absorber supported at a front end portion thereof for rocking motion in upward and downward directions at a lower portion of the muffler 49 by a pivot shaft 55 and provided between the swing arm 53 and an upper end portion of a pivot plate 51. A step holder 407 including a rider's step 403 is provided between the front wheel 25 and the rear wheel 47.

Output power of the engine 31 is transmitted to the rear wheel 47 through a drive shaft (not shown). The drive shaft is built into the swing arm 53 and is disposed on the left side of the engine 31, in a state where it is directed in the forward direction Fr which is the advancing direction of the motorcycle.

A fuel tank 63 supported by the main frames 17 is disposed above the engine 31, and a rider's seat (main seat) 65 for being seated by a rider is disposed rearwardly of the fuel tank 63 such that it is supported by the seat rails 21. A pillion seat 67 as a passenger's seat for being seated by a passenger is disposed rearwardly of the rider's seat 65.

A canister 201 is provided downwardly of a rear portion of the fuel tank 63 and traps vaporized fuel gas in the fuel tank 63 without allowing the same to leak to the outside. The fuel tank 63 includes a lid 210, a fuel filler 212, and a purge pipe 213.

A radiator 69 is disposed forwardly of the engine 31. The front side of the head pipe 15 of the vehicle body frame 11 is covered with a front cowl 71 made of synthetic resin. Further, a front portion of the main frames 17, the radiator 69 and a front portion and a lower portion of the engine 31 are covered from the opposite sides with a lower side cowl (not shown) made of synthetic resin and connecting to the front cowl 71.

A rear cowl 73 for covering a rear portion of the vehicle body frame 11 and a rear fender 75 disposed below the rear cowl 73 for covering the rear wheel 47 from above are attached to a rear portion of the vehicle body frame 11. Further, a pair of left and right plate attaching portions 77, to which a license plate (not shown) is attached, are provided on the rear fender 75.

A rear combination lamp 79, in which a pair of left and right turn signal lamps 302 and a tail and stop lamp 304 between the left and right turn signal lamps 302 are integrated, is disposed in the rear cowl 73 in such that a rear portion of the rear combination lamp 79 faces rearwardly from a rear end of the rear cowl 73. As shown in FIG. 1, the motorcycle includes a pillion step holder 81 provided on the left and right of the vehicle body, and a pillion step 83.

Figure 3:
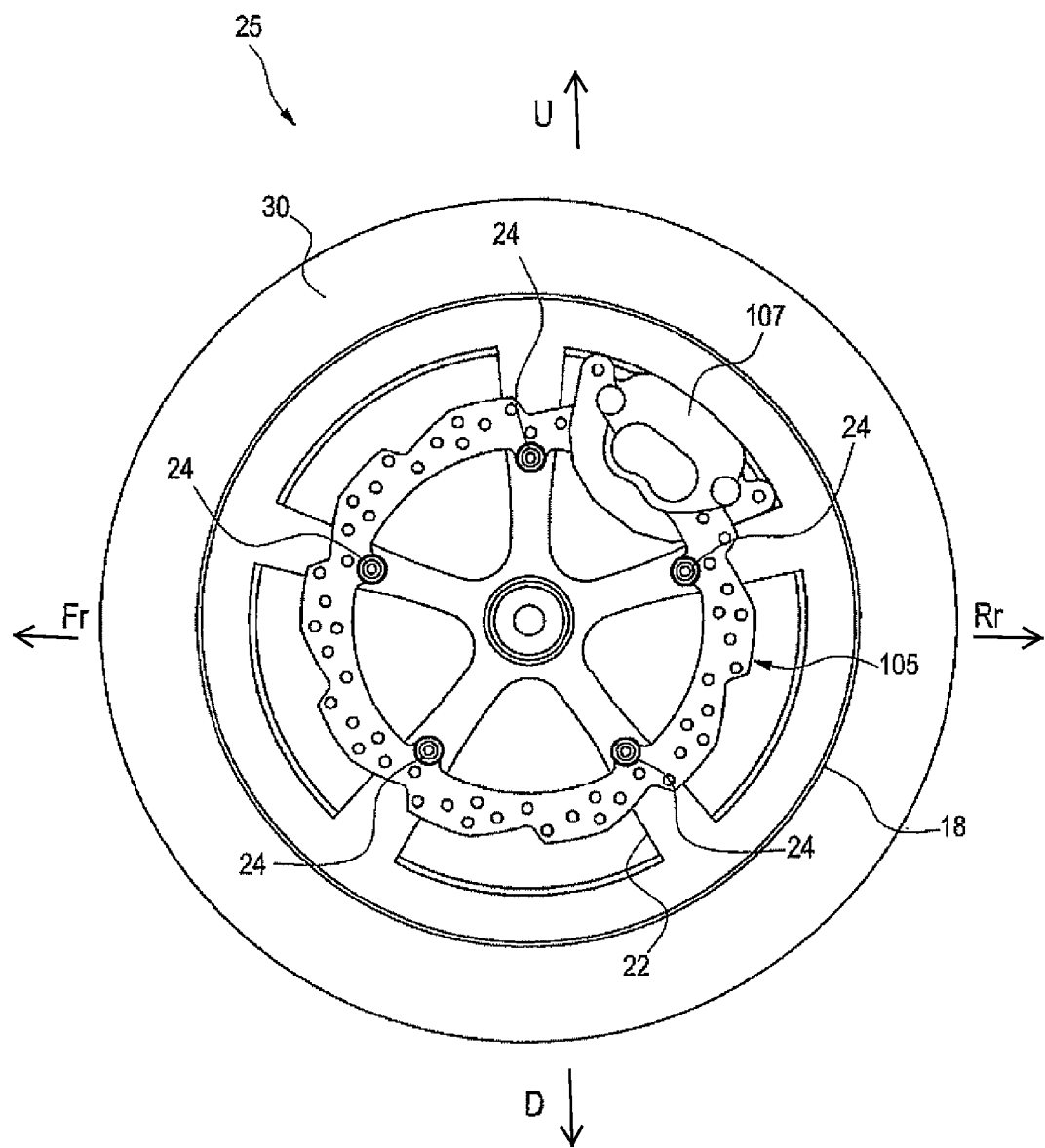
FIG. 3 is a side plan detail view illustrating an assembled state of a brake disk on a front wheel of the motorcycle.
Figure 4:
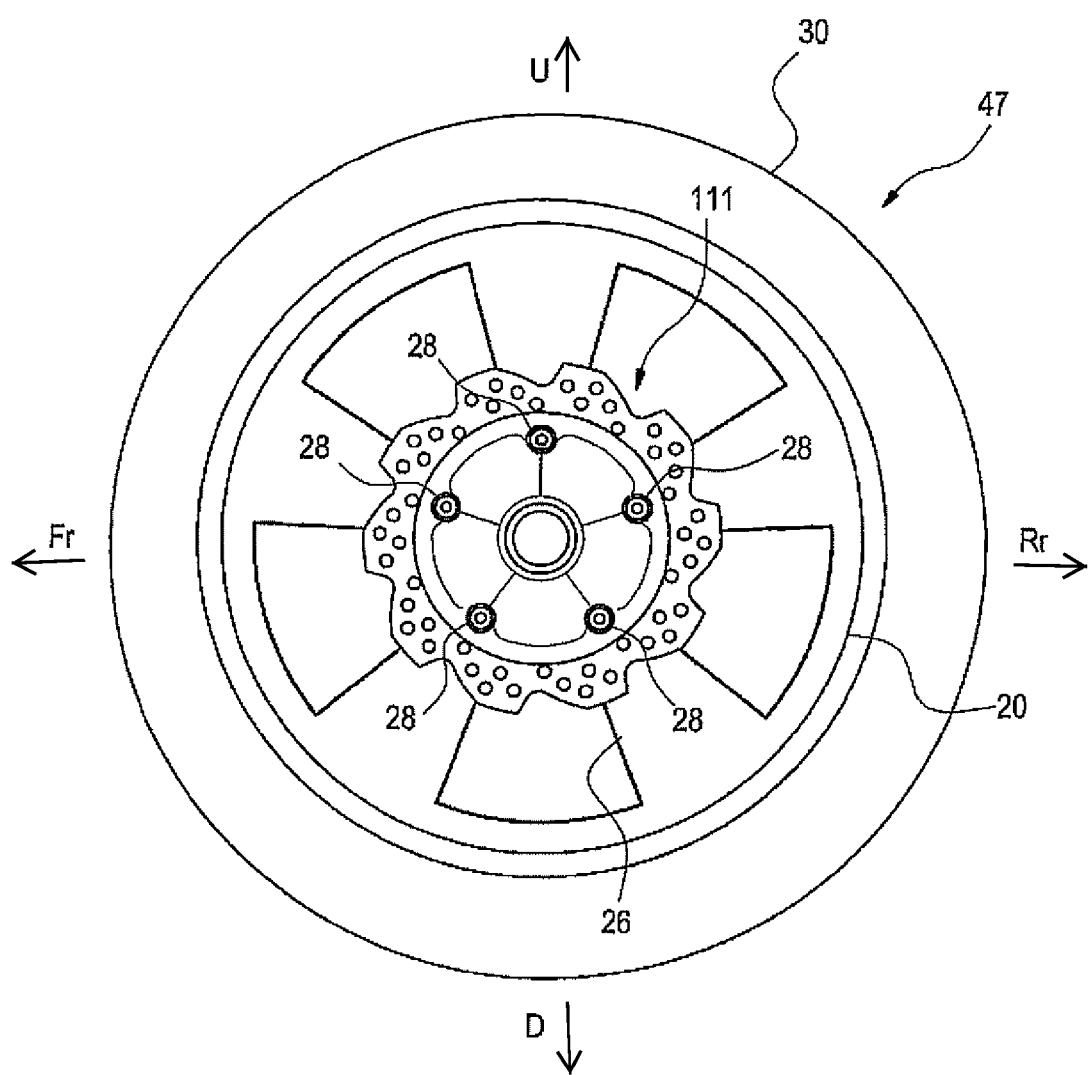
FIG. 4 is a side plan detail view illustrating an assembled state of a brake disk on a rear wheel of the motorcycle.

FIG. 3 is a side plan detail view illustrating an assembled state of a brake disk 105 on a front wheel 25, and FIG. 4 is a side plan detail view illustrating an assembled state of a brake disk 111 on a rear wheel 47.

The brake disk 105 for the front wheel 25 shown in FIG. 3 is attached to the front wheel 25 by being secured to a spoke 22 of a wheel 18 of the front wheel 25. The brake disk 111 for the rear wheel 47 shown in FIG. 4 is attached to the rear wheel 47 by being secured to a spoke 26 of a wheel 20 of the rear wheel 47 by a bolt 28. As shown in FIGS. 3 and 4, a tire 30 is mounted on each of wheels 18, 20.

Figure 5:
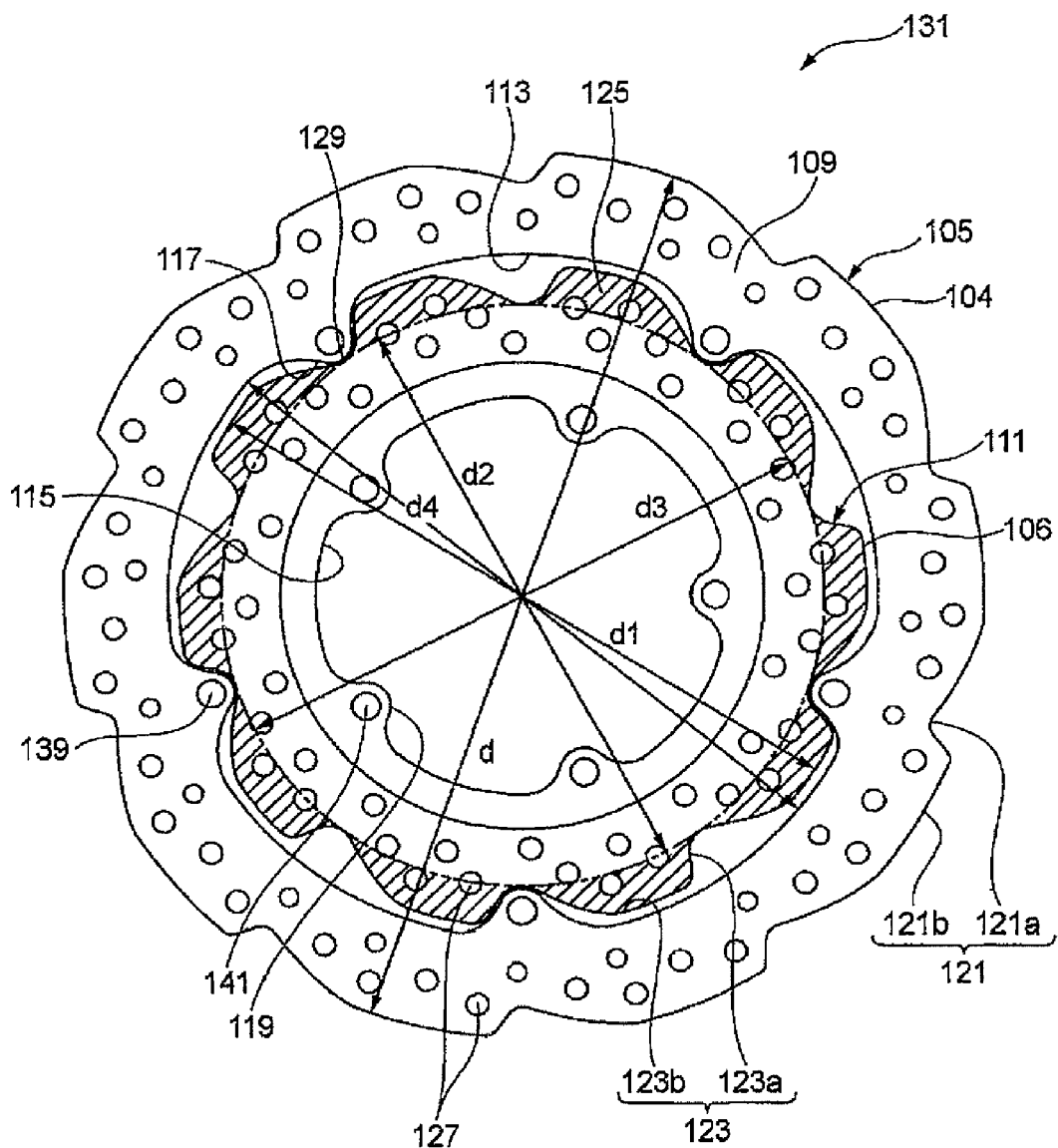
FIG. 5 is a plan view of a disk member used for producing the brake disks for the front and rear wheels of the motorcycle.

FIG. 5 is a plan view of a disk member 131 including the brake disks 105, 111 for the front and the rear wheels 25, 47.

Each of the brake disks 105 and 111 includes an annular disk section 104 or 106 having braking faces 109 or 125 and having a plurality of (five in the example shown) attaching portions 117 or 119 provided at a plurality of locations in a circumferential direction on the inner circumference side of the disk section 104 or 106 and projecting inwardly in a diametrical direction from an inner peripheral face 113 or 115. The attaching portions 117 and 119 are connected to spokes 22 and 26 of the wheels 18 and 20 by bolts 24 and 28, respectively.

An outer peripheral phase 121 or 123 of each of the brake disks 105 and 111 is formed in a wave shape from a plurality of depressed portions 121a or 123a and a plurality of projecting portions 121b or 123b juxtaposed at equal intervals in the circumferential direction. In other words, the brake disks 105 and 111 are formed as so-called wave disks.

Since the outer peripheral faces 121 and 123 are formed in a wave shape, the dimension in a diametrical direction of the braking faces 109 and 125, which are contacted by the friction pads, varies in the circumferential direction.

A maximum outer diameter d1 of the wave-shaped outer periphery of the inner brake disk 111 for the rear wheel 47 is greater than a minimum inner diameter of the outer brake disk 105 for the front wheel provided as a projecting end diameter d2 of the outer brake disk 105, where the projecting end diameter d2 is measured between a plurality of maximum inwardly projecting portions 129 of the attaching portions 117 of the outer brake disk 105 for the front wheel 25. Meanwhile, a minimum outer diameter d3 of the wave-shaped outer periphery of the inner brake disk 111 vehicle body frame 11 for the rear wheel 47 is substantially equal to the projecting end diameter d2 of the outer brake disk 105 measured between a plurality of the attaching portions 117 of the outer brake disk 105 for the front wheel 25. This geometry is made possible because the inwardly-projecting attaching portions 117 of the outer brake disk 105 extend inwardly into spaces provided by alternating depressed portions 123a of the wave-shaped outer periphery of the inner brake disk 111, as shown.

The inner diameter of the front disk section 104 of the brake disk 105 for the front wheel 25 is denoted by d4, the inner side in a diametrical direction of the brake disk 105 for the front wheel 25 with respect to the inner diameter d4 is formed as an front disk side wave portion, and this serves as the attaching portion 117.

In the brake disk 111 for the rear wheel 47, a portion defined by the minimum outer diameter d3 and the outer peripheral face 121 (refer to a portion indicated by slanting lines in FIG. 5) is formed as a rear disk side wave portion, and this serves as a braking faces 125.

It may be noted that the braking faces 125 of the brake disk 111 for the rear wheel 47 may include an inner side portion in a diametrical direction with respect to the wave portion. A plurality of lightening holes 127 is formed so as to extend through the braking faces 109 and 125 in order to enhance the reduction of weight and a superior heat radiating property.

Consequently, the two large and small brake disks blanked from the single disk member 131, that is, the brake disk 111 which is the inner side disk and the brake disk 105 which is the outer side disk, can be ready as one set for one motorcycle 1.

In the brake disk 111 for the rear wheel 47, the outer side portion in a radial direction with respect to the minimum outer diameter d3 serves as the braking faces 125. In other words, since the wave portion of the rear brake disk 111 is sandwiched, the effectiveness of the rear brake disk 111 is raised to a high level, while the RR attaching portion 117 of the brake disk 105 is provided.

Further, the heat mass of the rear brake disk 111 and the front brake disk 105 can be assured to be greater by an amount corresponding to the heat mass, and they can be applied readily to a vehicle such as a large motorcycle.

Further, in the present illustrative embodiment, the maximum outer diameter d of the brake disk 105 for the front wheel 25 is formed equal to or greater than 300 mm, and the maximum outer diameter d1 of the rear brake disk 111 of the rear wheel 47 is formed equal to or smaller than 240 mm. Where the assured diameters of the two blanked outer side disk and inner side disk of the large and small sizes are at least 320 mm and 240 mm, respectively, they can be applied as effective brake disks for the motorcycle 1.

Now, a manufacturing method of the brake disks 105, 111 for the front and rear wheels 25, 47 is described.

Figure 6C:
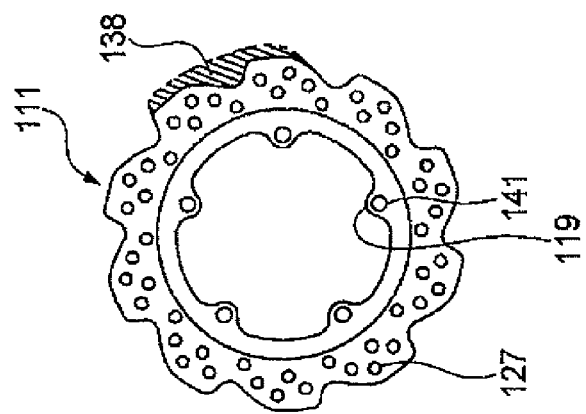
FIG. 6C is plan view of brake disks obtained by a still further blanking step of the disk member.
Figure 6B:
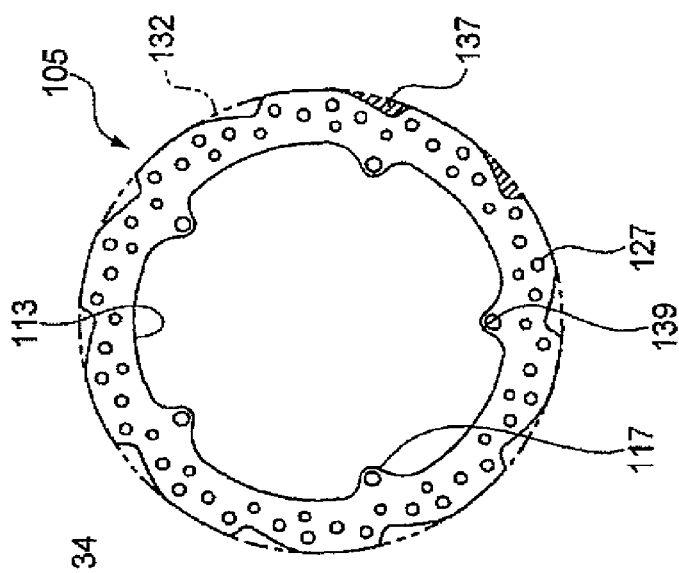
FIG. 6B is plan view of brake disks obtained by a further blanking step of the disk member.
Figure 6A:
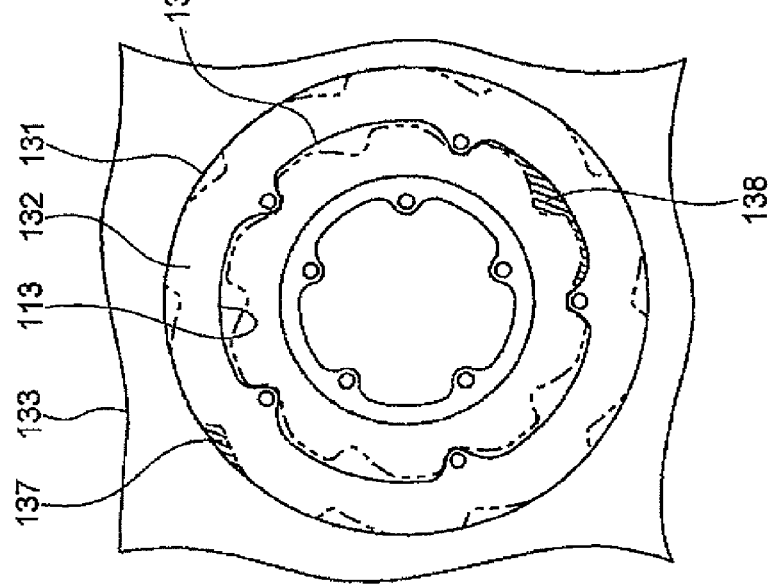
FIG. 6A is plan view of the brake disks obtained by an initial blanking step of the disk member.

FIGS. 6A-6C show plan views of brake disks 105, 111 obtained by blanking steps of the disk member 131.

The brake disks 105 and 111 are manufactured by blanking a stainless steel plate by a pressing machine. In particular, a plate-like member 133 as a material plate shown in FIG. 6A is blanked in a circular shape along the outer diameter d of the brake disk 105 for producing the disk member 131.

The disk member 131 is blanked along the inner diameter side 113 of the brake disk 105 for producing two disks 132 and 134. By blanking the single disk member 131 in a wave form in a circumferential direction at an intermediate portion in the diametrical direction (at the outer diameter of the disk 134), the disk 132 which is the outer side disk and the disk 134 which is the inner side disk are manufactured.

Thereafter, not only the disk 132 but also the disk 134 are blanked at unnecessary portions (portions indicated by slanting lines) 137 and 138, and the lightening holes 127 shown in FIG. 6A and FIG. 6B are perforated by using a pressing machine.

The front disk side wave portion which projects to the inner side in a diametrical direction of the disk 132 is used as the attaching portion 117 on a wheel. The rear disk side wave portion which projects to the outer side in a diametrical direction of the inner side disk 111 is used as a pad sandwiching portion (braking face 125).

Subsequently, a plurality of mounting holes 139 and 141 of the attaching portions 117 and 119 are perforated by machining Finally, chamfering of an edge is carried out to complete the manufacture of the brake disks 105, 111.

It may be noted that in the manufacturing procedure described above, it is possible to suitably change the working order.

FIGS. 7A-7C show plan views of a sprocket wheel obtained by blanking steps of the disk member 131 according to a modification.

Further, while in the manufacturing steps described above, the outer side disk 105 and the inner side disk 111 are manufactured from the single disk member 131, as a modification, the brake disks and some other components may be manufactured as shown in FIGS. 7A-7C.

The single disk member 131 is cut out from a plate-like member 133 which is a material plat. The disk member 131 is blanked into two disks 143 and 145. The disk 143 can be used as a brake disk 147 while the other disk 145 can be used as a sprocket wheel 149.

In this manner, in the present manufacturing method, the single disk member 131 is blanked at an intermediate portion in a diametrical direction to obtain two large and small brake disks 105 and 111. Then, the outer side disk is used as the brake disk 105 for the front wheel 25 and the inner side disk is used as the brake disk 111 for the rear wheel 47 of the motorcycle 1. Thus, the two large and small brake disks as the inner side disk and the outer side disk, can be ready as one set for a single motorcycle 1.

As described above, according to the method of manufacturing brake disks, the single disk member 131 is blanked at an intermediate portion thereof in a diametrical direction to obtain two large and small brake disks 105 and 111 which are the inner side disk and the outer side disk. Consequently, the production yield of wave disks can be improved.

Further, according to the method of manufacturing brake disks of the present embodiment, the brake disks 105 and 111 which are two large and small disks including the inner side disk and the outer side disk blanked from the single disk member 131 are used as a set, and the brake disks 105, 111 of the same motorcycle 1 can be formed by pressing from the same piece of material. Therefore, the manufactured brake disks can be managed readily.

Further, according to the method of manufacturing brake disks of the present embodiment, the outer diameters of the brake disks 105 and 111 which are the two blanked large and small disks as the outer side disk and the inner side disk can be assured to be at least 300 mm and 240 mm, respectively. Consequently, the two disks can be applied, in general, as the front and rear brake disks of the motorcycle 1.

Further, according to the brake disk of the present embodiment, the brake disks 105 and 111 which are the two large and small disks as the inner side disk and the outer side disk blanked from the single disk member 131 can be ready as one set, and the brake disk for the front wheel and the brake disk for the rear wheel of the same motorcycle 1 can be manufactured by pressing from the same member (piece) of material. Therefore, it is easy to manage the manufactured brake disks.

Further, according to the brake disk of the present embodiment, the outer diameters of the brake disks 105 and 111 which are the two blanked large and small disks as the outer side disk and the inner side disk can be assured to be at least 300 mm and 240 mm, respectively. Consequently, the two disks can be applied, in general, as the front and the rear brake disks of the motorcycle 1.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A disk brake system for a saddle-type vehicle, said disk brake system formed from a single metal plate member and comprising an outer brake disk provided for a front wheel of the vehicle, and an inner brake disk provided for a rear wheel of the vehicle;
    wherein:
    the outer brake disk comprises:
        an annular disk portion for being sandwiched by brake pads, and
        an attaching portion provided in such a manner as to project to the inner side in a diametrical direction of the disk portion;
    the inner brake disk comprises:
        a disk portion having a wave-shaped outer periphery for being sandwiched by brake pads, and
        a plurality of inwardly projecting attaching portions formed integrally with, and provided on the inner side in a diametrical direction with respect to the disk portion;
    a maximum outer diameter of the wave-shaped outer periphery of the inner brake disk is greater than a minimum inner diameter of the outer brake disk, where said minimum inner diameter is defined by a circle intersecting a plurality of tip ends of the inwardly projecting attaching portions of the outer brake disk; and
    a minimum outer diameter of the wave-shaped outer periphery of the inner brake disk is substantially equal to said minimum inner diameter of the outer brake disk.

2. A disk brake system according to claim 1, wherein the outer brake disk has an outer diameter of 300 mm or more; and the inner brake disk has a maximum outer diameter of 240 mm or less.

3. A disk brake system for a saddle-type vehicle according to claim 1, wherein said outer brake disk and the inner brake disk are formed by cutting out a single disk member at an intermediate portion in a diametrical direction thereof into a wave shape.

4. A disk brake system for a saddle-type vehicle according to claim 3, wherein said disk member is formed from a plate material comprising stainless steel.

5. A disk brake system for a saddle-type vehicle according to claim 1, wherein each of said inner and outer brake disks, respectively, includes a plurality of mounting holes formed at inner portions thereof; wherein said mounting holes are arranged at substantially regular intervals.

6. A disk brake system for a saddle-type vehicle according to claim 1, wherein each of said inner and outer brake disks, respectively, have a plurality of lightening holes formed therein.

7. A vehicle comprising first and second brake disks formed as outer and inner brake discs, respectively, from a single metal plate member,
    the outer brake disk comprising:
        an annular disk portion having a wave-shaped outer periphery; and
        a plurality of attaching portions formed integrally with and provided in such a manner as to project to the inner side in a diametrical direction of the disk portion; and
    the inner brake disk comprising:
        a disk portion having a wave-shaped outer periphery;
        a plurality of attaching portions formed integrally with and provided on the inner side in a diametrical direction with respect to the disk portion,
    wherein a maximum outer diameter of the wave-shaped outer periphery of the inner brake disk is greater than a minimum inner diameter of the outer brake disk, where said minimum inner diameter is defined by a circle intersecting a plurality of tip ends of the inwardly projecting attaching portions of the outer brake disk;
    wherein a minimum outer diameter of the wave-shaped outer periphery of the inner brake disk is substantially equal to a said minimum inner diameter of the outer brake disk;
    and wherein said first and second brake disks are formed by formed by cutting out at an intermediate portion in a diametrical direction of a circular disk member into a wave shape, wherein said circular disc member is formed from said single metal plate member.

8. A vehicle according to claim 7, wherein the outer brake disk is usable as a brake disk for a front wheel of the vehicle; and the inner brake disk is usable as a brake disk for a rear wheel of said vehicle.

9. A vehicle according to claim 7, wherein the outer brake disk has an outer diameter of at least 300 mm, and wherein the inner brake disk has a maximum outer diameter of 240 mm.

10. A vehicle according to claim 7, wherein said disk member is cut out from a stainless steel plate member.

11. A vehicle according to claim 7, wherein each of said outer and inner brake disks has a plurality of mounting holes formed therein.

* * * * *